No. 857,387. PATENTED JUNE 18, 1907.
P. DURANDO.
MACHINE FOR MANUFACTURING CELLULOID COMBS.
APPLICATION FILED FEB. 2, 1906.

No. 857,387. PATENTED JUNE 18, 1907.
P. DURANDO.
MACHINE FOR MANUFACTURING CELLULOID COMBS.
APPLICATION FILED FEB. 2, 1906.

No. 857,387. PATENTED JUNE 18, 1907.
P. DURANDO.
MACHINE FOR MANUFACTURING CELLULOID COMBS.
APPLICATION FILED FEB. 2, 1906.

WITNESSES
INVENTOR
Pascal Durando
BY
ATTORNEYS

No. 857,387.

PATENTED JUNE 18, 1907.

P. DURANDO.

MACHINE FOR MANUFACTURING CELLULOID COMBS.

APPLICATION FILED FEB. 2, 1906.

WITNESSES:

INVENTOR
Pascal Durando
BY
ATTORNEYS

No. 857,387. PATENTED JUNE 18, 1907.
P. DURANDO.
MACHINE FOR MANUFACTURING CELLULOID COMBS.
APPLICATION FILED FEB. 2, 1906.

WITNESSES
David Levine
Henry J. Suhrier

INVENTOR
Pascal Durando
BY
ATTORNEYS

THE NORRIS PETERS CO., WASHINGTON, D. C.

No. 857,387. PATENTED JUNE 18, 1907.
P. DURANDO.
MACHINE FOR MANUFACTURING CELLULOID COMBS.
APPLICATION FILED FEB. 2, 1906.
10 SHEETS—SHEET 8.

No. 857,387. PATENTED JUNE 18, 1907.
P. DURANDO.
MACHINE FOR MANUFACTURING CELLULOID COMBS.
APPLICATION FILED FEB. 2, 1906.
10 SHEETS—SHEET 9.

INVENTOR
Pascal Durando
BY
ATTORNEYS

No. 857,387. PATENTED JUNE 18, 1907.
P. DURANDO.
MACHINE FOR MANUFACTURING CELLULOID COMBS.
APPLICATION FILED FEB. 2, 1906.
10 SHEETS—SHEET 10.

WITNESSES
INVENTOR
Pascal Durando
BY
ATTORNEYS

UNITED STATES PATENT OFFICE.

PASCAL DURANDO, OF LYON, FRANCE.

MACHINE FOR MANUFACTURING CELLULOID COMBS.

No. 857,387. Specification of Letters Patent. Patented June 18, 1907.

Application filed February 2, 1906. Serial No. 299,134.

*To all whom it may concern:*

Be it known that I, PASCAL DURANDO, a citizen of the Republic of France, residing in Lyon, in said Republic, have invented certain new and useful Improvements in Machines for Making Combs, of which the following is a specification.

This invention relates to machines for making combs of celluloid and similar material.

The invention has among its objects to provide a machine in which there is no waste of the material used and in which the comb is given its final form in one operation.

A further object of the invention is to furnish a machine which effects the cutting out, finishing and ornamentation of two combs from one plate or sheet of stock in one operation, the teeth of one comb being stamped out to form the interdental spaces of the other comb. The invention further contemplates the provision of a construction by which the ornamentation of the combs may be very readily varied by interchanging some of the parts of the machine.

It is also an object of the invention to generally improve and increase the efficiency and capacity of machines for the purpose mentioned.

In the accompanying drawings, in which the same reference characters denote the same parts throughout the different views.

The machine consists essentially of two dies or matrices which may, in practice, be secured to suitable parts and forced together after the celluloid sheet has been inserted between the same by any suitable power, said dies being provided with instrumentalities for cutting out and forming two combs from one sheet of celluloid at one operation. The dies are also provided with means for stamping any desired ornamental design upon the backs of the combs, and with means for removing the finished combs from said dies after the pressing or stamping operation has taken place.

Figure 1:
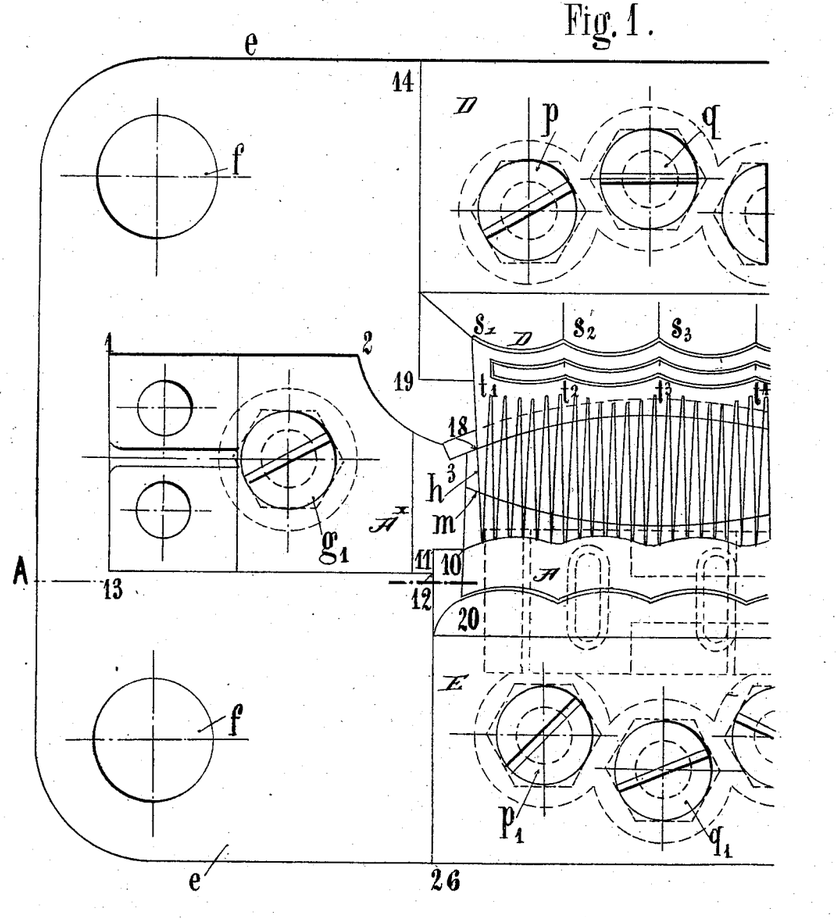
Figure 1 is a bottom plan view of the upper die of a machine constructed in accordance with the invention.
Figure 2:
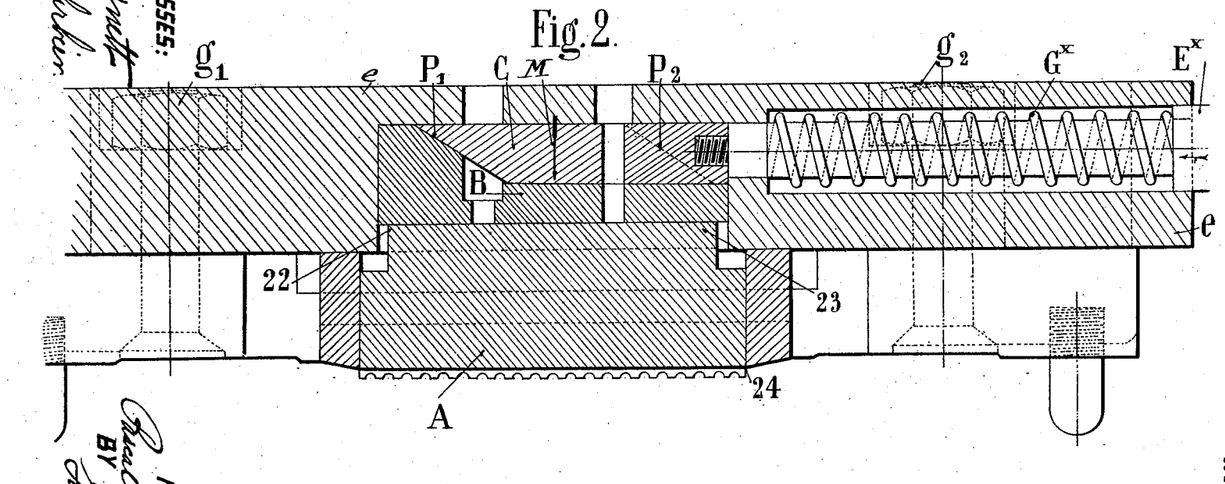
Fig. 2 is a longitudinal vertical section taken on line A—A, Fig. 1.
Figure 3:
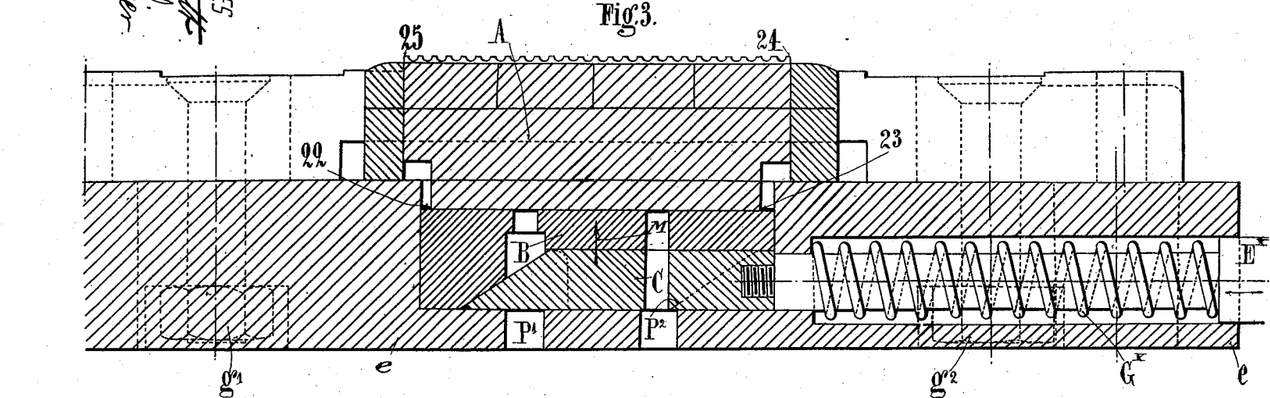
Fig. 3 is a similar section of the bottom die taken on line B—B, Fig. 4.

Fig. 1 illustrates the upper die, which may be applied to the movable member of a press operated by suitable power, and in Fig. 2 is shown the lower die, which may be secured to a table or other fixed part, and toward which the upper die is movable. Or the upper and lower dies may be mutually movable toward and away from each other. Both of the dies are constituted by the same parts, and hence a detailed description of one die will suffice.

As shown in Fig. 1, the upper die comprises a plate $e$ which is secured to its supporting part by means of bolts (not shown) passing through bolt-holes $f$ in said plate. It is to this plate that the various stamping parts of the die are secured, as will now be described.

Figures 4, 5:
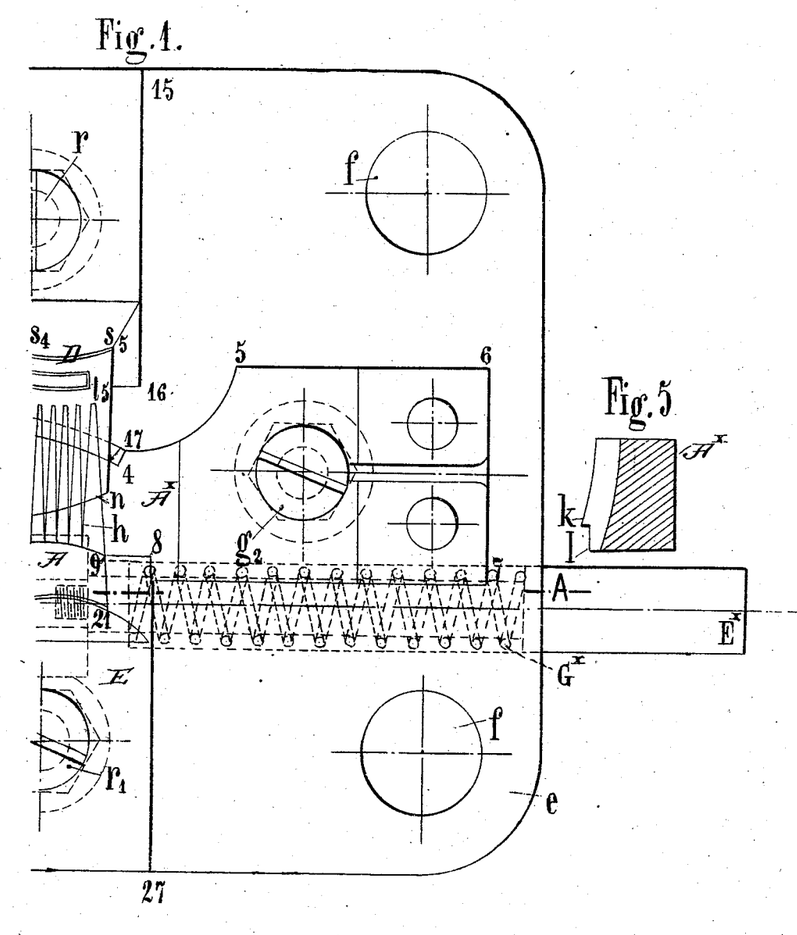
Fig. 4 is a plan view of the lower die.
Fig. 5 is a detail view showing one of the teeth-forming plates in section.
Figure 4:
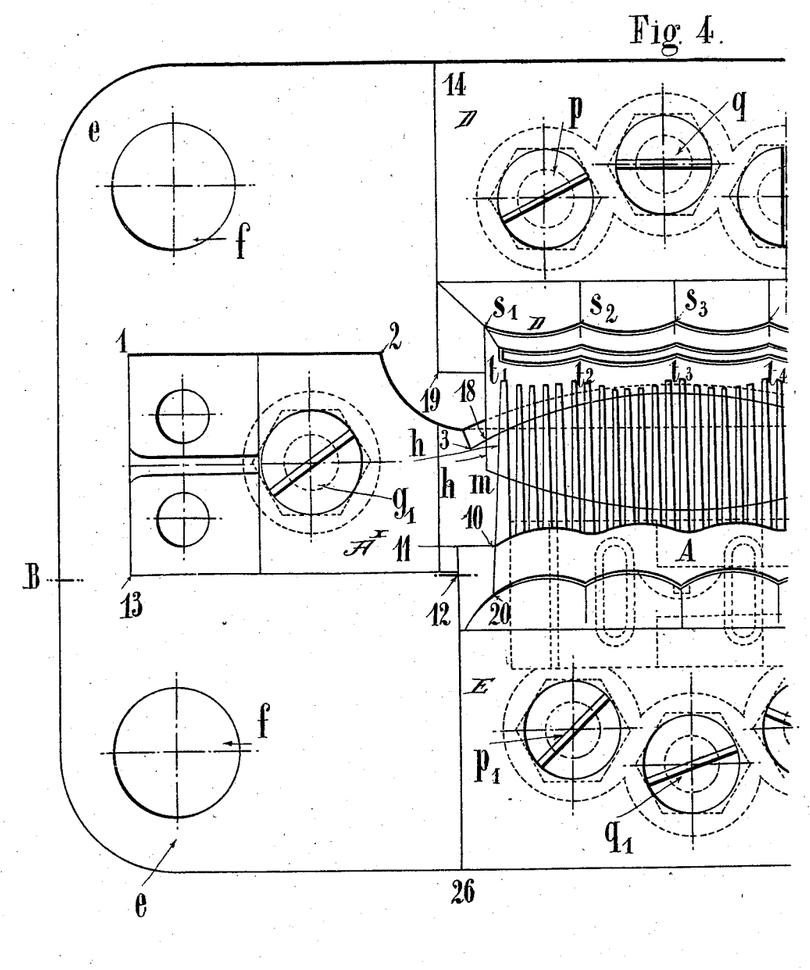
Figure 6:
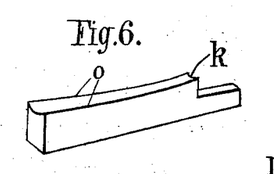
Fig. 6 is a detail perspective view showing the arrangement of the cutting edges of the teeth-forming plates.
Figure 7:
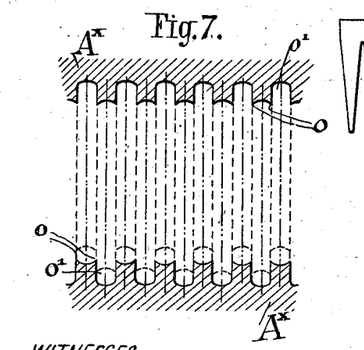
Fig. 7 is a vertical section showing the two teeth-forming plates arranged in superposed relation prior to acting on the sheet of stock placed between the same.
Figure 9:
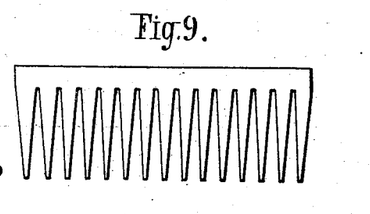

Extending longitudinally of the plate $e$ and secured thereto by means of bolts $g^1$, $g^2$ is a central teeth-forming plate $A^\times$, the outline of which is denoted by the numbers 1, 2, 3, 4, 5, 6, 7, 8, 9, 10, 11, 12, 13. This plate, as shown in Figs. 1, 4 and 9, is provided intermediately, and preferably at or near the center of the die, with a curved teeth-forming portion which is formed by a plurality of alternating grooves $o^1$ and cutting edges $o$, as best shown in Fig. 7. Fig. 6 illustrates the form of a pair of cutting edges, showing that the same are so curved as to form between them a portion which constitutes a half-mold for a comb-tooth. These portions alternate with the grooves $o^1$, which are also curved and so shaped as to form half-molds for the comb-teeth. The teeth-forming plates $A^\times$ of the upper and lower dies are superposed in the manner shown in Fig. 7, so that the cutting edges of one plate are vertically alined with and adapted to enter the grooves of the other plate, while the cutting edges of the latter plate enter the grooves of the first-named plate. Thus when a sheet of celluloid stock is placed between the upper and lower teeth-forming plates and the dies brought together by pressure there will be two series of comb-teeth formed, one series being compressed and formed in the grooves of one plate and the other series compressed and formed in the grooves of the other plate, this formation and compression being effected by the coöperating mold-portions formed by each pair of cutting edges and the corresponding groove of the other plate.

Figure 8:
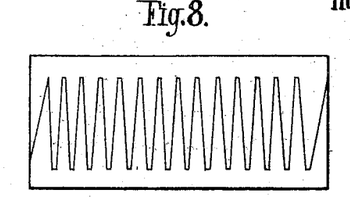
Figs. 8 and 9 are plan views of combs as heretofore cut out from a single sheet of stock.
Figure 10:
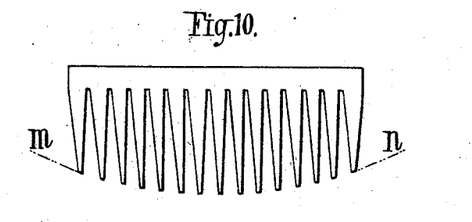
Fig. 10 is a plan view of a comb formed by the improved machine.
Figure 13:
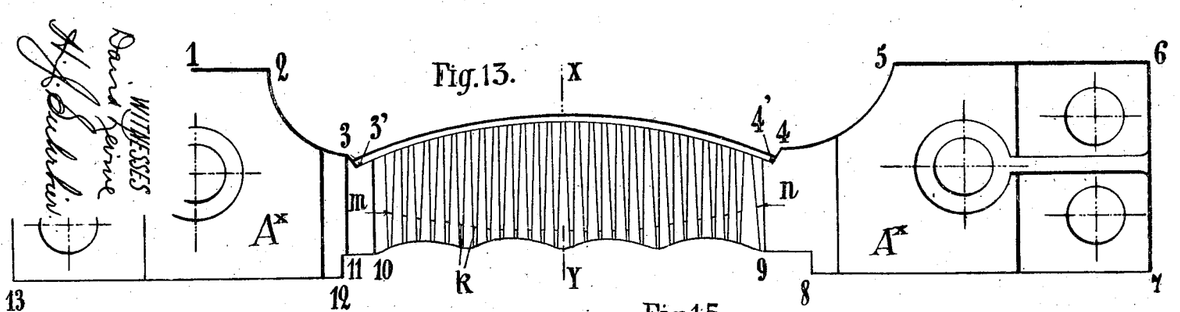
Fig. 13 is a plan view of one of the central teeth-forming plates, a portion of said plate being omitted.

The grooves and cutting edges of the teeth-forming plates are so constructed that the teeth of the combs formed thereby taper from their butt to their outer ends in the usual manner, the width and form of the grooves and the spaces between the cutting edges varying laterally of each teeth-forming plate for this purpose. At the end of each pair of coöperating cutting edges there is arranged a sharp transverse edge $k$ which serves to sever the teeth from the sheet of stock at their pointed ends and to properly form said ends. These transverse cutting edges or projections $k$ are arranged on a curved line $m$—$n$, as shown in Figs. 1, 4 and 13, so that the toothed edge of each comb will be curved, as shown in Fig. 10, thus giving to the comb the desired form. Heretofore combs have been sawed out of a sheet of celluloid in the manner shown in Fig. 8, the teeth of one comb being cut out to form the interdental spaces of the other comb, but by this process the curving of the toothed edge of the comb in the manner just described was not possible. By this process only a straight comb, such as shown in Fig. 9, could be formed.

Figures 14, 15:
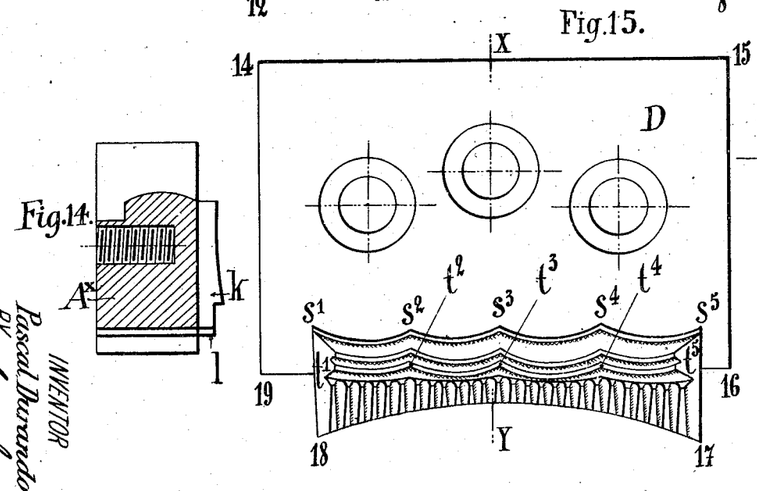
Fig. 14 is a section on line X—Y, Fig. 13.
Fig. 15 is a plan view of one of the plates which carry the pattern in intaglio and relief which is stamped on the sheet of celluloid or other material.
Figure 16:
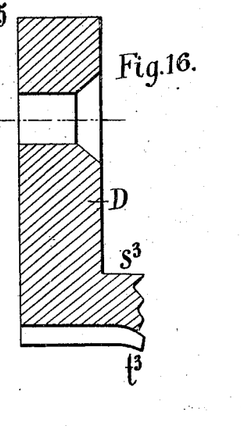
Fig. 16 is a section on line X—Y, Fig. 15.

One edge of the central part of the teeth-forming plate has a gradual curve $3'$, $4'$, while the opposite edge 9, 10, at which are arranged the ends 1 of the teeth-forming grooves, is sinuous, as best shown in Fig. 13. Against the curved edge of the plate $A^\times$ is placed a curved edge 17, 18 of a plate D which carries a pattern to be stamped out on the back of the comb, and also is provided with cutting edges and grooves which, when said plates are placed together in the manner shown, form continuations of the cutting edges and grooves of the teeth-forming plate, in order to produce the molding of the teeth up to the ornamental back of the comb. The outline of the part D is denoted by the numbers 14, 15, 16, 17, 18, 19, as shown in Figs. 1, 4 and 15, and the curve 17, 18 conforms exactly to the curve $3'$, $4'$ of the central teeth-forming plate so that the grooves and the cutting edges of the two plates may register accurately and thus form perfectly regular and continuous teeth. The plate D is bolted to the main plate $e$ of the die by means of bolts $p$, $q$, $r$. The pattern in intaglio and relief is formed on said plate near its inner edge and its outline indicated by $s^1$, $s^2$ .... $s^5$ and $t^1$ _ _ _ $t^5$. This pattern or design may obviously be varied as desired in order to stamp out combs having different ornamentations, it being merely necessary to replace the part D by a similar part having a different pattern. When the upper and lower dies are brought together on the sheet of stock it is obvious that a flat comb, having the outline $s^1$, $s^2$, $s^3$, $s^4$, $s^5$, $n$, $m$, will be stamped out by means of the two plates $A^\times$, D, and that the back of the comb will be ornamentally stamped by the latter part.

Figure 17:
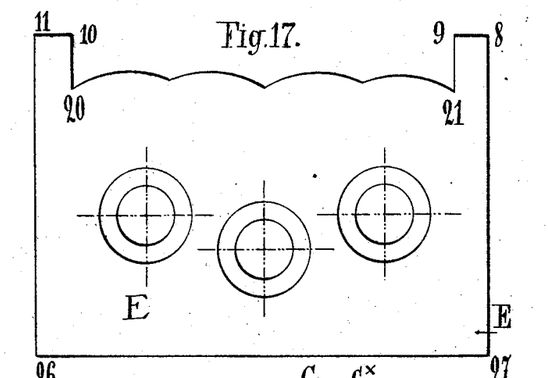
Fig. 17 is a plan view of another plate forming a part of each die.
Figures 18, 19, 20:
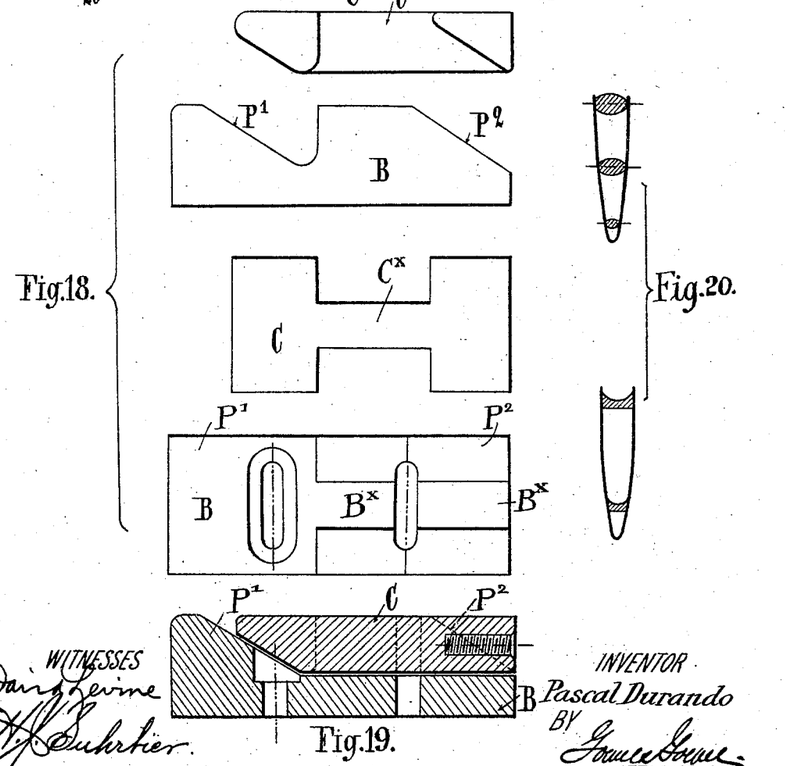
Fig. 18 is a detail view of the mechanism for actuating the ejecting block.
Fig. 19 is a detail section through said mechanism.
Fig. 20 shows in detail the arrangement of the cutting edges of the teeth-forming plates and the shape of the comb-teeth formed thereby.

Along the sinuous edge 9, 10 of the central teeth-forming plate $A^\times$ there fits a block A having a smooth outer surface and sinuous side-edges, one of which conforms closely to said sinuous edge of said teeth-forming plate. The outline of this plate is denoted by the numerals 9, 10, 20, 21, and the section is shown in Fig. 2 and indicated by the numbers 22, 23, 24, 25. The block A is held against shifting in lateral direction, away from the central teeth-forming plate, by means of a further plate E fitting against the block A in the manner shown in Figs. 1 and 4, said plate E having the outline 8, 9, 21, 20, 10, 11, 26, 27, as best shown in Fig. 17. The edge 20, 21 of said plate fits against the outer sinuous edge of the block A. Said plate is bolted to the main plate $e$ of the die by means of bolts $p^1$, $q^1$, $r^1$.

The block A constitutes a device for removing the comb from the die after the forming operation has been completed. Said operation takes place while the sheet of stock is subjected to heat, and consequently the finished comb will adhere more or less strongly to the parts of the die. It is to overcome this adhesion and to permit the comb to be readily removed from the die that an ejecting device is provided. The block A is movable in a plane perpendicular to the plane of the die. As will be seen from Figs. 2, 3 and 12, said block is arranged in the space between the parts $A^\times$ and E, said space communicating with a recess or cavity in the main plate $e$ in which an actuating device B, C for said ejecting block is located. Said actuating device consists of a channeled block B adapted to bear against the inner edge of the block A and provided at its ends with inclined portions P¹, P², as shown in Figs. 2, 3, 18 and 19. Said block is provided with a longitudinally-extending groove or channel B<sup>×</sup> in which is slidable the shank C<sup>×</sup> of a block C provided at its ends with laterally enlarged inclined portions designed to ride on the inclined portions P¹, P² of the block B. The block C is provided at one end with a threaded socket into which is inserted a rod or spindle E<sup>×</sup>. A helical spring G<sup>×</sup> surrounding the rod or spindle E<sup>×</sup> normally holds the blocks A, B, C in the position shown in Fig. 12. When it is desired to actuate the ejecting block A in the direction of the arrow M, shown in Fig. 12, the rod E<sup>×</sup> is pushed inwardly in opposition to the spring G<sup>×</sup>, whereupon the block C slides along the block B causing the inclined portions of said blocks B and C to ride each other and thus separate said blocks, so that the block B is pushed against the ejecting block A and causes it to protrude beyond the plates A<sup>×</sup> and E. This movement of the ejecting block causes the finished comb to be detached from the die. Upon the release of the rod E<sup>×</sup> the ejecting block is returned by the spring G<sup>×</sup> to its normal position.

In practice, the rods E<sup>×</sup> may be operated through suitable connections with the press, and the operation of said rods in order to produce the ejection of the finished comb at the proper moment is preferably automatic.

Figure 12:
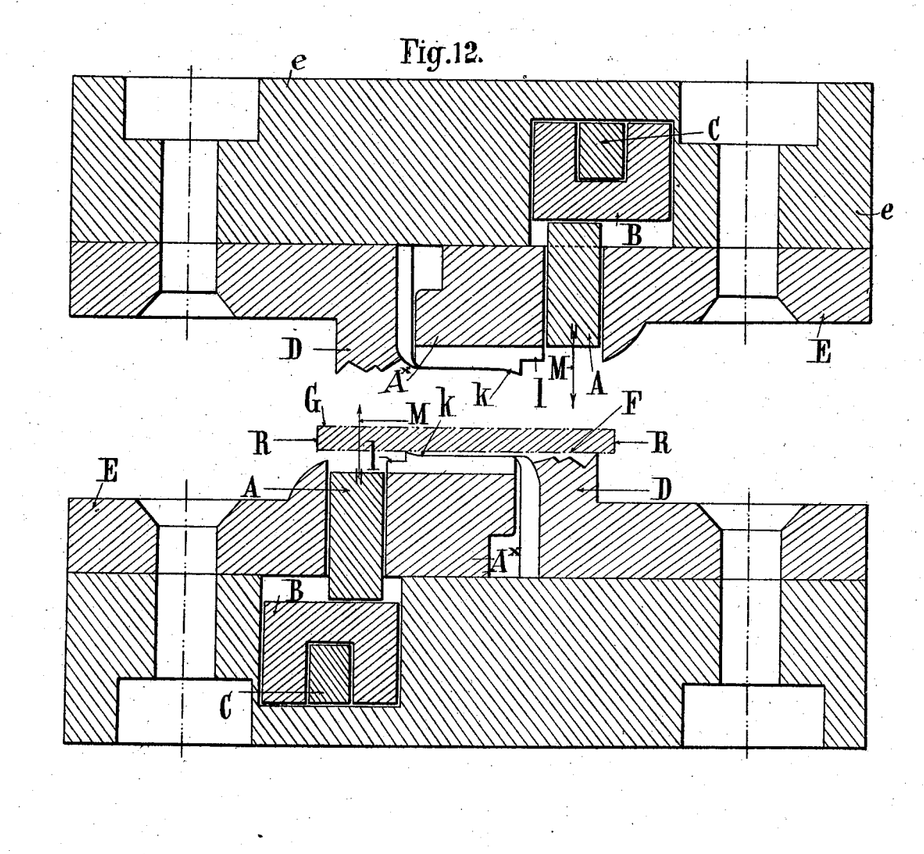
Fig. 12 is a transverse section through the upper and lower dies showing the same in position to cut and form the comb from the sheet of stock inserted therebetween.

In operation the dies are arranged one above the other in the manner shown in Fig. 12. In this position the relation of the parts of the two dies is reversed, so that the pattern-forming plate D of the upper die is directly above the plate E and ejecting block A of the lower die. The teeth-forming plates A<sup>×</sup> of the two dies are substantially superposed, but the cutting edges and grooves are disposed in opposite directions. The pattern-carrying plate D of the lower die is directly beneath the plate E and the ejecting block A of the upper die. The pattern-carrying portion of each of the plates D is in exact vertical alinement with the smooth ejecting block of the opposite die.

Figure 11:
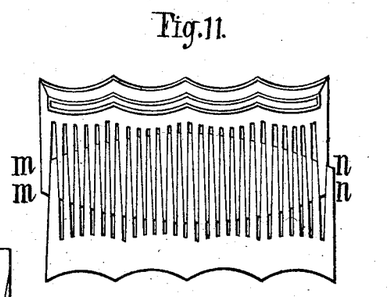
Fig. 11 shows a sheet of stock after it has been cut and pressed by the improved machine prior to the separation of the two combs formed.

The sheet of stock is placed upon the lower die, as indicated at R in Fig. 12. The two dies are then forcibly brought together, or the upper die is forcibly brought down on the lower die, as the case may be, so that the sheet of stock, which has been preliminarily heated, is compressed between said dies. This compression causes said sheet to be formed into two flat combs, the teeth of one being arranged in the interdental spaces of the other, as shown in Fig. 11. The coöperating action of the teeth-forming plates A<sup>×</sup> causes the teeth of the two combs to be formed practically throughout their length, said teeth being formed by the coöperating cutting edges and grooves, as explained in connection with Fig. 7. The plates D stamp the sheet of stock upon opposite faces thereof at the parts F, G, and thereby cause the patterns to be stamped on the backs of the combs and complete the teeth at their butt ends, as before described. The face of each comb opposite to the ornamental portion thus stamped out contacts with the smooth ejecting block of the opposite die and therefore has a smooth surface imparted to the same. The projections $k$ cause the ends of the teeth to be cut on a curved line, as heretofore explained.

After the dies have been brought together with the force requisite to properly stamp out the two combs, said dies are moved apart. The ejecting blocks A are then suitably operated by pushing in the rods E<sup>×</sup>, as previously explained, and this causes the two combs formed to be forced out of engagement with the teeth-forming and pattern-carrying plates, to which they are apt to adhere. The combs may be then very readily removed from the press and separated from each other.

The operation of the press in forming the combs is very rapid. The teeth of the combs are given their definite and final form and the backs of the combs are ornamented by the one simple operation of forcing together the dies on the sheet of stock. There is practically no waste of material as the material which is stamped out of one comb to form its interdental spaces forms the teeth of the other comb. The sheet of stock acted upon does not have to be appreciably greater in area than two finished combs having their teeth fitting between each other, as shown in Fig. 11. The outer edge of the pattern-carrying part of the plate D and the inner edge of the plate E are made very sharp in order to sever the sheet of stock, and the part of stock overlapping these edges is the only part which is not utilized in forming the combs.

It is evident that the sheets of stock may be so cut that when properly placed between the dies the amount of stock thus split off and wasted will be infinitesimal.

After the combs are removed from the press in flat condition, they may be given the desired curve by a subsequent operation.

It is evident that the ornamental design of the combs may be very readily varied, as desired, by merely changing the pattern-carrying plates D, which may be removed from and replaced on the main plate by means of their fastening bolts. The two combs formed at the same operation may thus be of the same pattern or of different patterns.

Having thus described my invention, I claim as new and desire to secure by Letters Patent:

1. A machine for making combs comprising means to stamp out in one operation a comb having an ornamented back.

2. A machine for making combs comprising means to stamp out in one operation a comb having finally formed teeth and an ornamental back.

3. In a machine for making combs, means for stamping out in one operation two combs having finally formed teeth and ornamental backs, the teeth of one comb being stamped out of the stock to form the interdental spaces of the other comb.

4. In a machine for making combs, the combination of two opposing dies which stamp out in one operation and from one sheet of stock two combs having ornamental backs.

5. In a machine for making combs, the combination of two opposing dies which stamp out in one operation and from one sheet of stock two combs having ornamental backs and finally formed teeth.

6. In a machine for making combs, a die having a teeth-forming plate and a pattern-forming plate.

7. In a machine for making combs, a die having a teeth-forming portion, and interchangeable means for stamping out on the back of the comb an ornamental design.

8. In a machine for making combs, a die having teeth-forming means thereon, and an interchangeable pattern-forming plate.

9. In a machine for making combs, a die having teeth-forming means, and a plate removably attached to said die and carrying a pattern to be stamped out on the back of a comb.

10. In a machine for making combs, a die, a teeth-forming plate applied to said die, and a pattern-forming plate applied to said die.

11. In a machine for making combs, a die, a teeth-forming plate carried thereby, a pattern-forming plate at one side of said teeth-forming plate, and an ejecting device at the other side of said teeth-forming plate.

12. In a machine for making combs, a teeth-forming plate to form the teeth throughout the greater part of their length, and a second plate to form the teeth at their butt ends.

13. In a machine for making combs, a teeth-forming plate to form the teeth throughout the greater part of their length, and a plate carrying a design in intaglio and relief to be stamped out on the back of the comb and means to form the teeth throughout the remainder of their length.

14. In a machine for making combs, a die comprising a main plate, a teeth-forming plate carried by said main plate, and a pattern-forming plate attached to said main plate and fitting against said teeth-forming plate.

15. In a machine for making combs, a die comprising a main plate, a central teeth-forming plate applied thereto, a pattern-forming plate attached to said main plate and abutting against said teeth-forming plate, and an ejecting block slidable at right angles to the plane of the die at one edge of said teeth-forming plate.

16. In a machine for making combs, a die comprising a central teeth-forming plate $A^\times$, a pattern-forming plate D, an ejecting block A, and a plate E to restrict the lateral movement of said ejecting block.

17. In a machine for making combs, opposing dies having teeth-forming plates thereon and pattern-forming plates, the pattern-forming plates of the two dies bearing an opposite relation to the teeth-forming plates.

18. In a machine for making combs, opposing dies having coöperating teeth-forming plates affixed thereto, said plates having grooves and cutting edges which taper oppositely.

19. In a machine for making combs, opposing dies, teeth-forming plates carried thereby, and pattern-forming plates also carried thereby, the pattern-forming plates of said dies being arranged at opposite sides of the teeth-forming plates.

20. In a machine for making combs, the combination of two opposing dies, each carrying a teeth-forming plate, a pattern-forming plate and an ejecting device, the teeth-forming plates being superposed but oppositely disposed, and the ejecting device of one die and the pattern-forming plate of the other die being arranged in superposed relation.

21. In a machine for making combs, opposing dies which stamp out in one operation two flat combs having finally formed teeth and ornamented backs, and means for ejecting the combs from the dies.

22. In a machine for making combs, two opposing dies which stamp out in one operation and from one sheet of celluloid two combs having finally formed teeth and having their backs stamped in intaglio and relief on opposite surfaces.

23. In a machine for making combs, coöperating dies, teeth-forming plates carried by said dies and provided with grooves and cutting edges which stamp out two combs from one sheet of celluloid, the teeth of one comb being stamped out to form the interdental spaces of the other comb, and plates carried by said dies to stamp on the backs of the combs ornamental designs in intaglio and relief.

24. In a machine for making combs, two coöperating dies, each carrying a teeth-forming plate, a plate for stamping the back of the comb, and an ejecting block, said devices of the dies being arranged in reverse relation.

25. In a machine for making combs, the combination of two dies, a central teeth-forming plate carried by each die and provided with tapered grooves and cutting edges, the grooves and cutting edges of one plate tapering oppositely from the other plate, pattern-carrying plates arranged at opposite edges of said teeth-forming plates, and an ejecting block movable at right angles to the plane of each die and arranged at the edge of the teeth-forming plate which is opposite to the pattern-forming plate.

In testimony whereof I have signed this specification in the presence of two subscribing witnesses.

PASCAL DURANDO.

Witnesses:
MARIN VACHON,
PIERRE REÜTTON.